United States Patent
Graage et al.

(10) Patent No.: US 6,559,551 B2
(45) Date of Patent: May 6, 2003

(54) STARTER DEVICE FOR FUEL CELL SYSTEM

(75) Inventors: Klaus Graage, Kirchheim/Teck (DE); Detlef Zur Megede, Kirchheim/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/960,394

(22) Filed: Sep. 24, 2001

(65) Prior Publication Data

US 2002/0047270 A1 Apr. 25, 2002

(30) Foreign Application Priority Data

Sep. 23, 2000 (DE) .......................... 100 47 200

(51) Int. Cl.⁷ ................................ H02N 3/00
(52) U.S. Cl. .................... 290/40 B; 290/52; 290/34
(58) Field of Search ................. 290/32, 34, 36 R, 290/40 R, 40 B, 40 C, 52; 322/14, 15; 60/626

(56) References Cited

U.S. PATENT DOCUMENTS

| 4,161,657 A | * | 7/1979 | Shaffer, Jr. ................ 290/1 R |
| 5,852,927 A | * | 12/1998 | Cohn et al. ................ 60/780 |
| 2002/0089234 A1 | * | 7/2002 | Gilbreth et al. ............ 307/80 |
| 2002/0163200 A1 | * | 11/2002 | Oglesby et al. ............ 290/52 |

FOREIGN PATENT DOCUMENTS

| DE | 0633158 A1 | * | 6/1994 | ........... B60L/11/18 |
| DE | 19731642 | | 2/1999 | |
| DE | 19923738 | | 11/2000 | |
| JP | 62076162 | | 4/1987 | |

* cited by examiner

Primary Examiner—Nicholas Ponomarenko
(74) Attorney, Agent, or Firm—Crowell & Moring LLP

(57) ABSTRACT

A starter device, preferably for cold-starting, for fuel cell systems, including a current generation system, for generating electrical energy, and a gas generation system, for generating $H_2$-rich gas for the current generation system. An internal-combustion engine generates mechanical energy, which can be connected to an air compressor for supplying air to the gas generation system via a drive shaft.

19 Claims, 1 Drawing Sheet

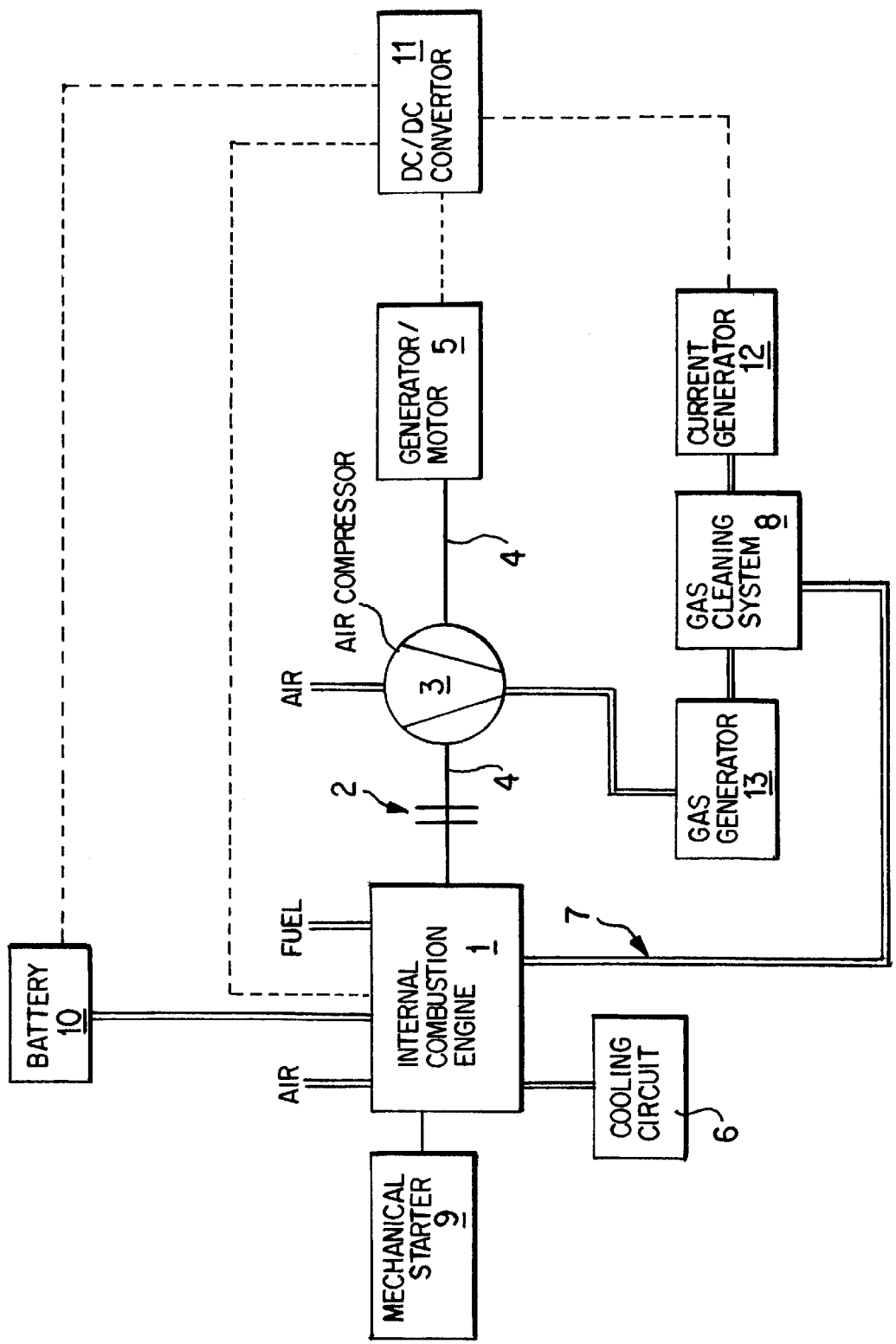

STARTER DEVICE FOR FUEL CELL SYSTEM

This application claims the priority of German Patent Document 100 47 200.1, filed Sep. 23, 2000, the disclosure of which is expressly incorporated by reference herein.

BACKGROUND AND SUMMARY OF THE INVENTION

The invention relates to a starter device, predominantly for cold-starting, for fuel cell systems. The fuel cell system including a current generation system for generating electrical energy and a gas generation system for generating $H_2$-rich gas for the current generation system.

Fuel cell systems for mobile applications use liquid fuel in order to generate hydrogen in the gas generation system. However, the gas generation system is only able to function after a certain operating temperature, which is dependent on the fuel, has been reached, and consequently it has to be heated up at the start of operation of the vehicle. The thermal energy required for this purpose is generated by burning fuel. In this case, the energy supply for the supply of air required for the combustion operation represents a limiting factor. The more air it is possible to provide for the combustion, the more quickly the operating temperature of the gas generation system is reached. Only after the operating temperature has been reached can the gas generation system supply fuel, for example hydrogen, for the fuel cells. However, electrical energy to drive the air-delivery device is required in order to supply air to the gas generation system. However, in mobile fuel cell systems, only a very limited amount of electric current is available before the operating temperature is reached and the fuel cell is started up.

In the prior art, these drawbacks are eliminated by using further storage units, e.g. a battery, a supercapacitor, or a hydrogen tank.

The following problems exist with the prior art:
- an undesirable waiting time between the starting of the vehicle and driving off in the vehicle,
- at low temperatures, a cold start is made even more difficult by the lack of power output from the battery,
- the number of attempted starts without the battery having to be externally recharged is limited.

It is an object of the invention to provide a device which eliminates the problems of the prior art and is therefore able to improve the cold-starting performance of mobile fuel cell systems.

The following descriptive invention is described on the basis of a vehicle with a fuel cell system, although it is not restricted to mobile applications and is also advantageous for stationary applications.

According to the invention, there is an internal-combustion engine for generating mechanical energy, which can be connected to an air compressor for supplying air to the gas generation system via a drive shaft. Therefore, in the starting phase of the vehicle, the combustion air required for heating the gas generation system can be delivered without stored energy, e.g. without operating a battery. Consequently, the operating temperature of the gas generation system is reached more quickly, typically in less than 30 seconds, with the result that the starting time of the current generation system of the vehicle is reduced considerably. Current can only be provided by the current generation system when the operating temperature of the gas generation system is reached.

The output of the internal-combustion engine is advantageously in the range between 1 and 10 kW. The quantity of air delivered by the air compressor is advantageously up to 200 $m^3$/h (s.t.p.), depending on the output of the internal-combustion engine.

There is advantageously a clutch, via which the internal-combustion engine can be connected to the air compressor. Therefore, if necessary the internal-combustion engine can be decoupled from the air compressor at any time and can be switched off, for example, in order to save fuel.

In a further advantageous embodiment, there is a mechanical device, for example a crank, or an electrical device, for example an onboard battery, for starting the internal-combustion engine. However, it is also possible for the internal-combustion engine to be started automatically by actuation of the door opener or the accelerator pedal of the vehicle or by the seat-belt being put on by the driver. Unnecessary waiting times until the operating temperature of the gas generation system is reached can thereby be avoided.

The cooling system of the internal-combustion engine is preferably connected to the cooling system of the vehicle.

The combustion exhaust gases of the internal-combustion engine are fed to a gas-cleaning system through an exhaust pipe and are discharged to the environment. The exhaust pipe of the internal-combustion engine is advantageously connected to the gas-cleaning system of the gas generation system. These measures lead to a more compact and light-weight structure of the vehicle.

In a particularly expedient embodiment, the internal-combustion engine is connected not only to the air compressor but also to a generator via the drive shaft. Therefore, the internal-combustion engine is able to supply both the air compressor and the generator with mechanical energy. The generator is able to supply not only the internal-combustion engine, via the onboard DC/DC converter, but also the 12 V network of the vehicle with current. The vehicle auxiliary units of the current generation system of the fuel cell system can also be powered via the 12 V network. Furthermore, the generator can charge the onboard battery for electrical cold-start ignition of the internal-combustion engine. Furthermore, the energy generated in the generator can be fed directly into the electric drive motor of the vehicle, with the result that the vehicle can be started in emergency situations, for example when the fuel cell system fails.

Furthermore, it is possible, depending on the operating state of the vehicle, for example when the vehicle is stationary, to connect up or decouple the internal-combustion engine. Therefore, for example when the vehicle is stationary, the current generation system can be switched off in order to save fuel. At the same time, the generator, which is driven by the internal-combustion engine, can be used to supply the vehicle auxiliary units, the internal-combustion engine and the fuel and water pumps with current.

In a further expedient embodiment of the invention, the generator can also be operated as an electric motor. It is therefore possible, when the internal-combustion engine is switched off and the clutch is closed, for the electric motor to drive the internal-combustion engine without ignition and fuel and therefore to use it as an additional air compressor.

Other advantages of the invention include:
- that it allows a significantly smaller onboard battery to be used in the vehicle,
- that the operating reliability is increased, since there is no restriction with regard to the number of attempted starts and with regard to the ability to start at low outside temperatures,
- that the high-pressure compressor of the current generation system which is usually used is eliminated, that in emergency situations the vehicle can be operated independently of the battery.

BREIF DESCRIPTION OF THE DRAWINGS

The sole FIGURE is a schematic representation of a starter device of the present invention.

DETAILED DESCRIPTION OF THE PREFERRED EMBODIMENT

The drawing illustrates a starter device according to the invention for a 75 kW fuel cell system. An internal-combustion engine 1 with an output of 10 kW is connected to an air compressor 3 via a drive shaft 4. The internal-combustion engine 1 generates a mechanical shaft output of approximately 5 kW. By means of a clutch 2, which is arranged on the drive shaft 4 between internal-combustion engine 1 and air compressor 3, the internal-combustion engine 1 can optionally be coupled to or decoupled from the air compressor 3. On the drive shaft 4, a generator 5, which can also be operated as an electric motor, is arranged on the other side of the air compressor 3.

The internal-combustion engine 1 is connected to the onboard battery 10 of the vehicle (not shown). The internal-combustion engine 1 can be started electrically by means of the onboard battery 10. A mechanical starter device 9, e.g. a crank, or a coupling to the accelerator pedal, door opener or seat-belt, is provided for mechanical starting of the internal-combustion engine 1. To supply the internal-combustion engine 1 with liquid fuel, there is a fuel tank (not shown), which as well as the internal-combustion engine 1 also supplies the gas generation system 13 with fuel. The gas generation system may be designed in particular as a reactor, in which an $H_2$-rich gas is generated by means of steam reforming, partial oxidation or autothermal reforming of hydrocarbons. Furthermore, an air supply for the purpose of forming an air/fuel mixture is provided. A fuel pump and the means for forming a mixture at the internal-combustion engine 1, as well as other units which are required for operation of the internal-combustion engine 1, such as a generator unit, an ignition system, are not shown. The cooling system of the internal-combustion engine 1 is connected to the cooling circuit 6 of the vehicle. The combustion exhaust gases from the internal-combustion engine 1 are fed through an exhaust pipe 7 to the gas-cleaning system 8 for the gas generation system 13 and are discharged to the environment.

The air compressor 3 is driven by the drive shaft 4 and supplies ambient air to the gas generation system 13 of the fuel cell system. This air is used as combustion air for heating up the gas generation system 13 in the starting phase of the vehicle. Furthermore, the air compressor 3 drives the generator 5 via the drive shaft 4. The generator 5 generates an electric power of approximately 3 kW for a fuel cell voltage of 250–400 V.

The generator 5 is connected to the onboard DC/DC converter 11 of the vehicle. Via the onboard DC/DC converter 11, the generator 5 feeds the 12 V network of the vehicle and supplies all the vehicle auxiliary units, e.g. ignition system, fuel and water pumps. Furthermore, the onboard battery 10 is charged and current is provided for supplying current to the internal-combustion engine 1. The generator 5 is likewise directly connected to the power supply of the electric drive motor (not shown). Therefore, the energy which is generated by the generator can in emergency situations be fed directly into the electric drive motor and can be used to move the vehicle.

When the vehicle is started up, the internal-combustion engine 1 is started either mechanically or electrically. Via the closed clutch 2, the compressor 3 and the generator 5 are driven. The generator 5 supplies the components of the current generation system 12 which are required for the starting operation, while the air compressor 3 delivers the combustion air which is required for rapid heating of the gas generation system 13. After the operating temperature of the gas generation system 13 has been reached, the clutch 2 is opened. The internal-combustion engine 1, which is thereby decoupled, is switched off. The current generation system 12 of the fuel cell system takes over responsibility for the current generation which is required for driving to function. The generator 5 drives the compressor 3 as an electric motor and is supplied by the fuel cell system.

The generator 5 may optionally be operated as an electric motor which is driven by the vehicle battery. Therefore, the compressor 3 can be driven via the drive shaft 4. When the clutch 2 is closed, it is also possible to drive the internal-combustion engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A starter device for cold-starting fuel cell systems, comprising: a current generation system, for generating electrical energy, and a gas generation system, for generating $H_2$-rich gas for the current generation system, wherein an internal-combustion engine for generating mechanical energy, is connected to an air compressor, via a drive shaft, for supplying air to the gas generation system.

2. The starter device according to claim 1, wherein the internal-combustion engine is connected to the air compressor via a clutch until an operating temperature of the gas generation system is reached.

3. The starter device according to claim 1, wherein the internal-combustion engine is started mechanically or electrically.

4. The starter device according to claim 1 further including a generator for supplying electrical energy to components of the current generation system which are required for starting.

5. The starter device according to claim 4, wherein the internal-combustion engine drives the generator via the drive shaft.

6. The starter device according to claim 4, wherein the generator supplies an electric drive motor of a vehicle with electrical energy.

7. The starter device according to claim 4, wherein the generator is operated as an electric motor.

8. The starter device according to claim 7, wherein the generator, operated as an electric motor, drives the air compressor.

9. The starter device according to claim 7, wherein the electric motor drives the internal-combustion engine in order to generate additional compressed air for the gas generation system.

10. The starter device according to claim 1, wherein the exhaust gases of the internal-combustion engine are passed into a gas-cleaning system for the current generation system.

11. A vehicle cold starting device for fuel cell systems, comprising:

an internal combustion engine generating mechanical energy, a current generation system for generating electrical energy;

a gas generation system for generating $H_2$-rich gas for said current generating system;

an air compressor connected to said internal combustion engine via a drive shaft wherein said air compressor supplies air to the gas generation system.

12. The device according to claim 11, further including a clutch between an output of said internal combustion engine and said air compressor wherein said clutch connects said internal combustion engine to said air compressor until said gas generation system reaches a predetermined temperature.

13. The device according to claim 11, wherein said internal combustion engine includes one of a mechanical starting device and an electrical starting device.

14. The device according to claim 11 further including a generator for supplying electrical energy to start up said current generation system.

15. The device according to claim 14 wherein said internal combustion engine drives said generator via said drive shaft.

16. The starter device according to claim 2 further including a generator for supplying electrical energy to components of the current generation system which are required for starting.

17. The starter device according to claim 5, wherein the generator supplies an electric drive motor of a vehicle with electrical energy.

18. The starter device according to claim 8, wherein the electric motor drives the internal combustion engine in order to generate additional compressed air for the gas generation system.

19. The device according to claim 11, wherein exhaust gases of the internal combustion engine are passed into a gas-cleaning system for the current generation system.

\* \* \* \* \*